US005693175A

United States Patent [19]

Jarrett

[11] Patent Number: 5,693,175

[45] Date of Patent: Dec. 2, 1997

[54] CLAMP FOR MAKING TUBING

[75] Inventor: Mark G. Jarrett, St. Clair Shores, Mich.

[73] Assignee: Hollowood, Inc., Clinton Township, Mich.

[21] Appl. No.: 543,790

[22] Filed: Oct. 16, 1995

[51] Int. Cl.[6] .......... B32B 31/20

[52] U.S. Cl. .......... 156/382; 156/285; 156/499; 156/583.3

[58] Field of Search .......... 156/285, 287, 156/381, 382, 580, 583.1, 499, 583.3

[56] References Cited

U.S. PATENT DOCUMENTS

| | | | |
|---|---|---|---|
| 2,457,504 | 12/1948 | Snoke | 156/285 X |
| 2,477,180 | 7/1949 | Hemming | 156/382 |
| 2,573,920 | 11/1951 | Ilch | 156/382 |
| 3,340,117 | 9/1967 | Inoue | 156/382 X |
| 3,788,926 | 1/1974 | Weisinger | 156/382 X |
| 3,891,489 | 6/1975 | Bordner et al. | 156/287 X |
| 3,950,211 | 4/1976 | Erwin | 156/382 |
| 4,710,251 | 12/1987 | Borchardt | 156/137 |
| 4,997,511 | 3/1991 | Newsom | 156/382 |
| 5,073,098 | 12/1991 | Mishima | 425/28.1 |

*Primary Examiner*—James Sells
*Attorney, Agent, or Firm*—Gifford, Krass, Groh, Sprinkle, Patmore, Anderson & Citkowski, P.C.

[57] ABSTRACT

An apparatus for applying pressure and heat to a tubular workpiece made up of layers of wood and bonding agent and formed on a tubular mandrel having a sealed, slit tube engageable with the exterior of the workpiece and acting with a housing and end walls to form an air pressure chamber by which the slit tube can be circumferentially expanded and contracted throughout its length and at the same time heat can be applied to the housing to heat the exterior of the tubular workpiece while heated air is circulated through the tubular mandrel on which the workpiece is supported to accelerate curing.

17 Claims, 2 Drawing Sheets

Fig-1
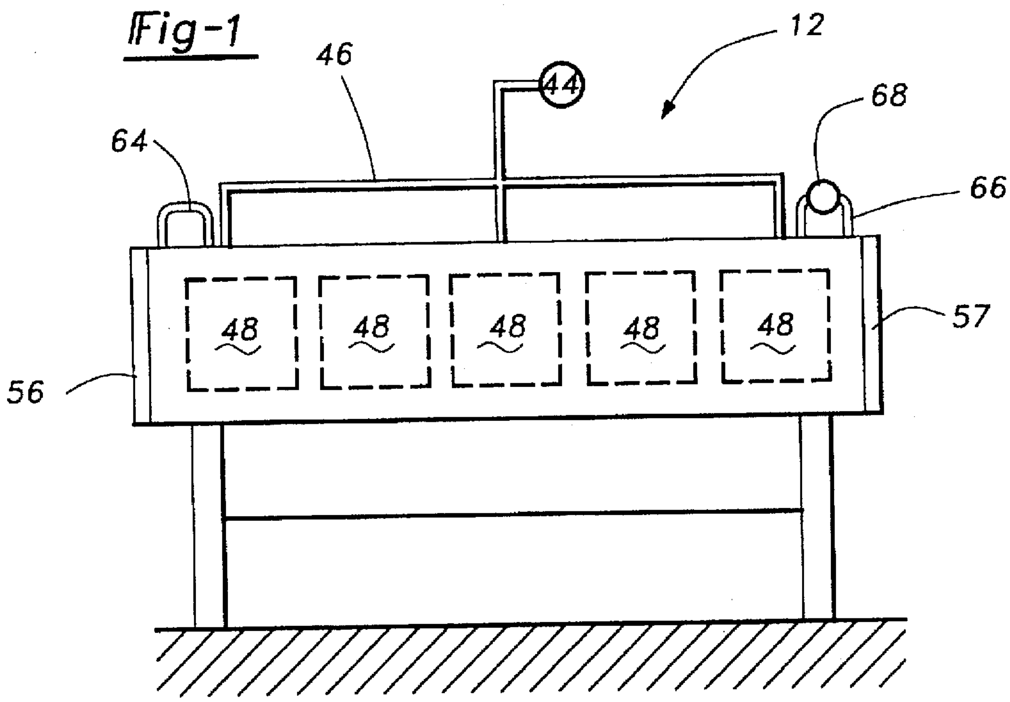
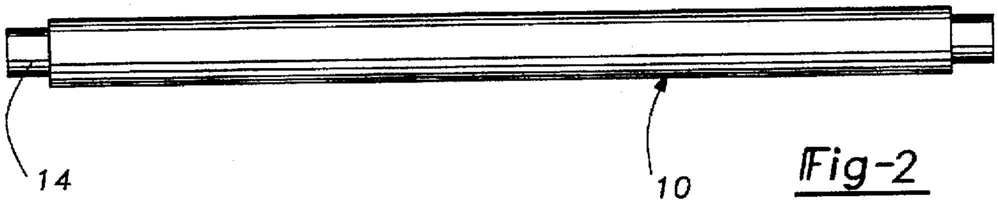
Fig-2
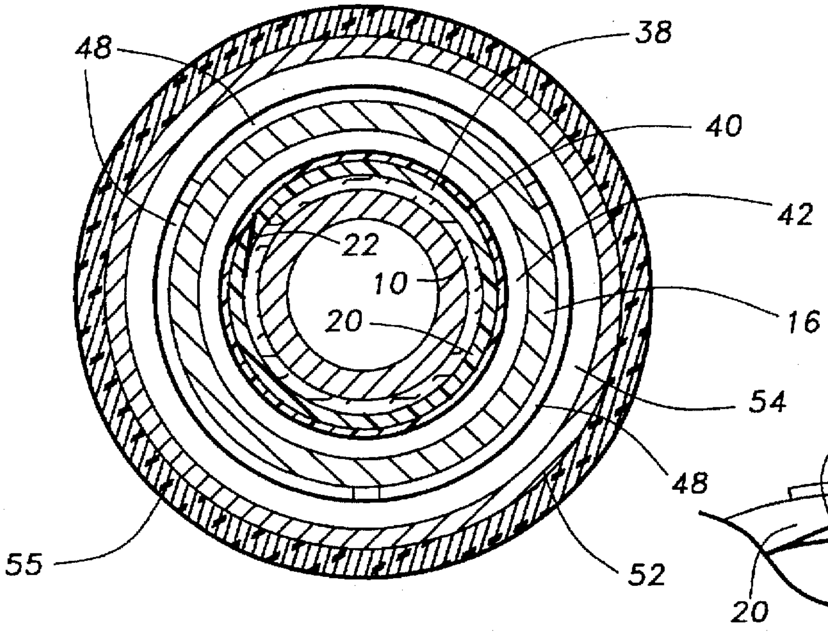
Fig-4
Fig-5
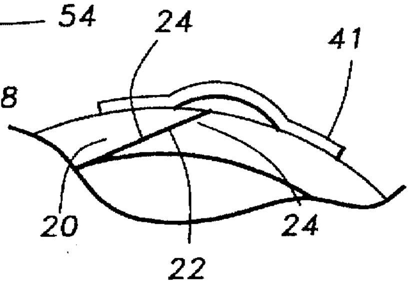

CLAMP FOR MAKING TUBING

This invention relates to apparatus for making tubular or cylindrical bodies from layers of material bonded together, and more particularly, to apparatus for applying heat and pressure to such tubes or cylindrical bodies.

In the manufacture of wooden tubes from layers of wood veneer, it is necessary to bend thin strips of wood veneer and distribute them uniformly in layers on a cylindrical mandrel together with a bonding agent such as glue or resin. The materials must then be retained in their assembled condition on the mandrel until the bonding materials cure. Usually, the curing operation is best carried out during the application of pressure uniformly to the outer surface of the tube to insure that the glue or bonding agent completely fills all voids in the material and between adjacent pieces of material as well as maintains a uniform wall thickness of the tubular body. At the same time it usually is necessary to apply heat to enhance and accelerate the curing.

Prior efforts to apply heat and pressure to tubes during the curing operation have involved clamping the mandrel and the material on the mandrel between fixed forms or jaws. In another form of clamping arrangement, the mandrel with the material distributed on it is clamped in the loop of a flexible sheet of metal or other material. Other apparatus have involved wrapping the exterior of the material on a mandrel with a sheet of flexible and disposable material which is spirally wound on the material to be cured. Still another form of apparatus involves wrapping an inflatable blanket around the material on the mandrel and thereafter inflating the blanket.

All of these methods are unsatisfactory because they result in the formation of tubes with parting lines which must be removed to make a commercially usable product. Also, the inflatable blanket applies pressure uniformly but material may have localized weak spots or areas of lower density than the surrounding material resulting in localized deformation of the material.

The present invention overcomes the limitations of the prior art by providing apparatus for applying pressure uniformly at an elevated temperature radially inwardly on the entire outer surface of a tube or cylindrical member.

DESCRIPTION OF THE DRAWINGS

FIG. 1 is an elevation of the apparatus embodying the invention;

FIG. 2 is a view of the workpiece on a mandrel to be treated in the apparatus;

FIG. 4 is a cross-sectional view taken on line 4—4 in FIG. 3; and FIG. 5 is a cross-sectional view of a modification of one of the elements of the apparatus of the invention.

DETAILED DESCRIPTION

Figure 3:
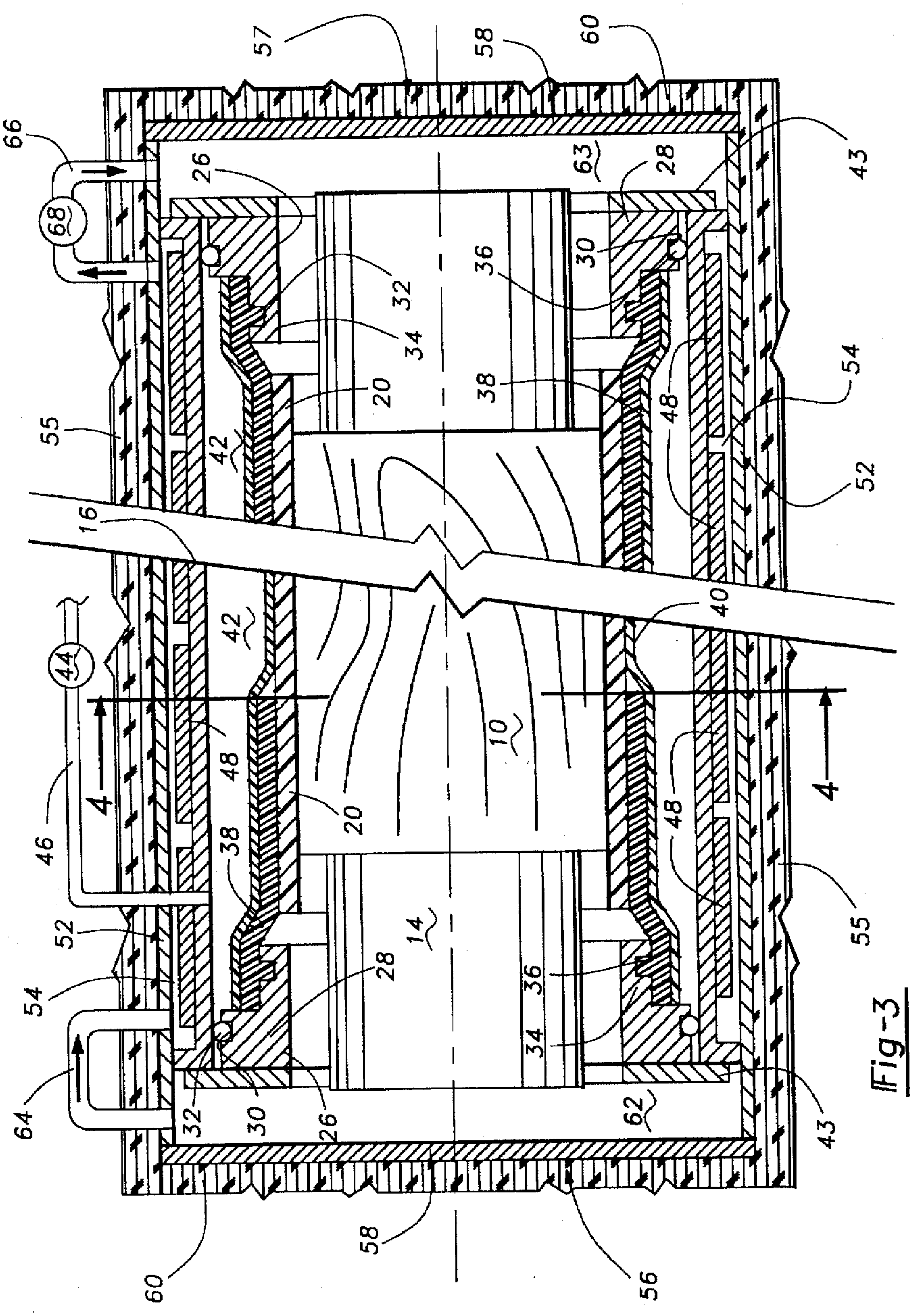
FIG. 3 is a cross-sectional view of the apparatus seen in FIG. 1 at a greatly enlarged scale.

The apparatus for clamping a tubular workpiece 10 is designated generally at 12. The workpiece 10 is in the form of material such as wood veneer arranged in layers together with layers of adhesive or resin which must be subjected to pressure and heat for a predetermined time to insure that the adhesive or resin is uniformly distributed and fills all the voids during the curing process, and so that the adhesives and resin are subject to uniform and adequate heat to insure complete curing. The workpiece 10 is supported on the exterior of a cylindrical mandrel 14 which, in a preferred embodiment of the invention, is in the form of an elongated stainless steel tube slightly longer than the furnished wood tube to be formed from the workpiece 10.

The apparatus 12, which receives the workpiece 10 and the mandrel 14, includes a metal tubular housing 16, as seen in FIG. 3, which is slightly longer than the mandrel 14 which is disposed within the tube or workpiece 10 to be clamped.

Disposed coaxially within the housing 16 is a slit tube 20 which is slightly longer than the workpiece or tube 10 to be formed and has an inside diameter slightly larger than the outside diameter of the tubular workpiece 10. The tube 20 has a slit 22 which extends for the full length of the tube 20. Opposite sides of the slit 22 are formed by complementary bevelled surfaces 24 which slidably engage each other and permit circumferential contraction and expansion of the tube 20. The tube 20 is made of S-glass, a high strength fiber glass in a matrix of high temperature epoxy resin. Such a construction affords stiffness longitudinally of the slit tube 20 and at the same time allows for deflection circumferentially to afford substantially uniform contraction and expansion of the tube 20 over its entire length.

The slit tube 20 is supported coaxially within the housing 16 for circumferential expansion and contraction by a pair of annular collars 26, one of which is disposed at each end of the slit tube 20 and housing 16. The annular collars 26 each include a flange 28 having a groove 30 which receives an O-ring 32. The O-ring 32 is seated in the groove 30 and engages the inside diameter of the housing 16 to seal the annular collar 26 relative to the housing 16. The annular collar 26 also has a tubular stem portion 34 which has an annular groove 36 to receive one end of a boot 38. The boot 38 also extends a short distance over each end of the slit tube 20. The boot 38 is made of a tube of coaxially woven "Kevlar" which is bonded in a matrix of high temperature epoxy to the stem 34 and annular groove 36. The boot 38 is similarly bonded to the outer exposed surface of the slit tube 20 except in the area adjacent to the slit 22 so that there is no interference with circumferential expansion and contraction of the tube 20.

The boots 38 serve as a reinforcement for opposite ends of a flexible, airtight tube 40 made of temperature resistant silicone. The flexible tube 40 extends between the collars 26 and also is bonded with high temperature silicone adhesive to the exterior of the slit tube 20 except adjacent to the slit 22, and at its opposite ends in the areas where it overlaps the stems 34 and the ends of the boots 38. The silicone tube 40 forms an air tight barrier between the annular collars 26 and over the entire length of the slit tube 20 so that an airtight, annular pressure chamber 42 is formed and can be defined generally by the interior wall of the housing 16, the exterior of the silicone tube 40 and the pair of annular collars 26 which are each sealed to the housing 16 and to the slit tube 20. As an alternative to the silicone tube 40, a strip of silicone 41 can be formed to cover the slit 22, as shown in FIG. 5. The strip 41 extends the full length of the tube 20 and boots 38, and opposite sides of the strip are fixed to the tube 20 with epoxy resin to seal the slit 22 and to permit circumferential flexing of the tube 20.

The annular collars 26 can move axially a limited amount relative to the housing 16 and slit tube 20, and are contained within the housing 16 by end caps 43 fastened to the end of the housing 16 by bolts or the like (not shown).

The annular chamber 42 is in communication with a source of pressure designated at 44, in FIG. 3, through means of a manifold 46. In the case of positive pressure, the pressure source 44 can be a reservoir of compressed air and in the case of negative pressure the source 44 can be in the form of a suction pump.

Upon application of positive pressure, the entire slit tube 20 is contracted circumferentially so that the beveled edges 24 slide relative to each other to reduce the internal diameter of the tube 20. The application of negative pressure causes a reverse movement of the beveled edges 24 of the slit 22 and an increase in the internal diameter of tube 20 which facilitates removal of the workpiece 10.

Disposed on the exterior of the housing 16 is an array of electrical heaters 48 which in the preferred embodiment, as indicated in FIG. 1, are arranged in five zones extending longitudinally and axially of the housing 16 with each of the zones being capable of separate control to facilitate maintaining uniform temperature of the workpiece 10.

A tubular metal shield 52 is supported exterior of the heaters 48 in spaced relation to form an annular air chamber 54. The metal shield 52 is coated with a layer of foam insulating material 55 which resists escape of heat from the annular chamber 54 containing the heaters 48.

As seen in FIG. 3, the ends of the tubular shield 52 are closed by removable caps 56 and 57 each of which includes a circular plate 58 covered with a layer of insulated foam 60. The caps 56 and 57 serve to form air chambers 62 and 63 at opposite ends of the apparatus 10 which are in communication with the interior of the hollow tubular mandrel 14. The chamber 62 also communicates with the annular air chamber 54 formed between the housing 16 and the shield 52 through a duct 64. The other chamber 63 is placed in communication with the annular air chamber 54 by means of a duct 66 which includes a blower 68. Operation of the blower 68 serves to pull heated air from the chamber 54 and deliver it to the chamber 63, from which it is directed to the interior of the mandrel 14. At the opposite end of the mandrel 14, air is exhausted to the chamber 62 and through the duct 64 from which it is returned to the opposite end of the annular air chamber 54. The circulation of the hot air in this manner serves to heat the interior of the mandrel and therefore the workpiece 10 to further accelerate the uniform distribution of heat. In this manner, hot air can be moved in a closed circuit from the chamber 54 to the interior of the mandrel 14 and returned to the chamber 54 for reheating.

The apparatus 12 is used by opening one end by removal of the end cap 56. This exposes the open end of the slit tube 20 so that a mandrel 14 with the tubular workpiece 10 mounted thereon can be loaded axially into the slit tube 20.

With the workpiece 10 and the mandrel 14 disposed in the slit tube 20, and with the end caps 56 in closed position, heat and pressure can be simultaneously applied to the workpiece 10. Pressure is applied by way of air under pressure delivered to the air pressure chamber 42 from the pressure source 44 through the manifold 46. Air pressure to the order of 250 psi have been found suitable. This causes pressure to act radially inwardly on the silicone tube 40 and on the slit tube 20 causing the slit tube 20 to be deflected circumferentially to squeeze the workpiece 10 within. At the same time, heat is applied by the heaters 48 which serve to heat the housing 16 and its contents also heat is directed in the form of heated air axially within the mandrel 14. Particularly in the case of thermal setting glues, the heat is important in making the glue molten so that the application of force by the slit tube 20 squeezes the bonding medium into any voids in the material mass of the workpiece 10. Temperatures approaching 300 degrees can be used.

After an appropriate time, the application of heat and pressure can be interrupted, which results in the tube 20 enlarging to its original dimension. Under some circumstances, it may be desirable to enlarge the tube 20 additionally to facilitate removal of the workpiece 10 and loading with a new workpiece. In that case, the manifold 46 can be subjected to negative pressure which will cause the tube 20 to expand circumferentially. Thereafter the cap 56 can be removed to give access to the mandrel 14 with the treated workpiece 10 which can be removed as a unit from the end of slit tube 20 in readiness to accept another mandrel 14 with another workpiece 10. After removal of the heated and compressed assembly of the mandrel 14 and workpiece 10, the mandrel 14 can be pulled from the workpiece 10 and made available to accept another workpiece 10. The removed workpiece can be moved to a workstation for cooling and any further processing that may be required such as sanding, finishing or cutting to length.

If desired, both end caps 56 and 57 can be removed from the apparatus 12 to facilitate loading, so that the mandrel 14 and workpiece 10 can be discharged from within the slit tube 20 by or upon insertion of an untreated workpiece 10 on a mandrel 14 at the opposite end of the apparatus 10. This serves to speed up a continuous manufacturing process.

An apparatus by which heat and pressure can be applied to a tubular workpiece made up of layers of wood and bonding agent to accelerate curing in which a slit tube engages the exterior of a workpiece disposed on a tubular mandrel and in which the slit tube acts with a tubular housing and end collars to form an air pressure chamber by which the slit tube can be circumferentially contracted and expanded uniformly throughout its length and at the same time heat can be applied to the housing to heat the exterior of the tubular workpiece and hot air can be circulated through the interior of the tubular mandrel supporting the workpiece to heat the interior of the tube to accelerate curing.

I claim:

1. Apparatus for applying pressure to the exterior of an elongated tubular member, comprising:

an elongated housing;

a slit tube disposed in said housing and adapted to receive an elongated tubular member, said slit tube having its slit extending the full length of said slit tube, said slit tube being substantially rigid longitudinally and being deflectable circumferentially with opposed edges of said slit being in engagement and being moveable circumferentially relative to each other;

means for sealing said slit and sealing the opposite ends of said slit tube relative to said housing to form an annular pressure chamber within said housing and exterior of said slit tube; and a source of pressure selectively communicating with said chamber to deflect said tube circumferentially and apply pressure uniformly to said tubular member disposed within said slit tube.

2. The apparatus of claim 1 wherein said means for sealing includes a flexible wall surrounding said slit tube and sealed to the opposite ends of said housing.

3. The combination of claim 1 wherein said means for sealing said slit includes a strip of flexible sealing material extending over the full length of said Slit and fastened to said tube at opposite edges of said slit.

4. The apparatus of claim 1 wherein said means for sealing includes a pair of end caps at opposite ends of said tube having a sealing connection to opposite ends of said housing and to opposite ends of a flexible wall surrounding said slit tube.

5. The apparatus of claim 1 wherein said source is at a positive pressure to inflate said chamber and compress said slit tube and at a negative pressure to deflate said chamber and expand said slit tube.

6. Apparatus for clamping a cylindrical workpiece under pressure comprising:

an elongated tubular housing;

a slit tube within said housing having an internal diameter substantially equal to the outside diameter of said cylindrical workpiece and forming a slit extending for the full length of said tube, opposed edges of said slit being beveled and in overlapping contacting relation to each other;

a first seal structure sealing opposite sides of said slit and a second seal structure sealing the ends of said slit tube relative to said housing to form an annular, inflatable chamber formed between said slit tube and said housing; and a source of pressure selectively communicating with said annular chamber to deflect said slit tube circumferentially to apply pressure to a member disposed in said slit tube.

7. The combination of claim 6 wherein said second seal structure includes a pair of annular caps attached to the opposite ends of said housing.

8. The combination of claim 7 wherein each of said caps includes an O-ring between said cap and housing.

9. The combination of claim 7 wherein said caps are moveable axially of said slit tube.

10. The combination of claim 7 wherein said seal structure includes a flexible tube surrounding the entire slit tube.

11. The combination of claim 10 wherein said seal structure is bonded to a substantial portion of the exterior surface of said slit tube.

12. The combination of claim 11 wherein said source of pressure is variable to a negative pressure to enlarge said slit tube circumferentially.

13. The combination of claim 6 wherein said seal structure is formed of a temperature resistant silicone material.

14. The combination of claim 7 wherein said seal structure includes a reenforcing boot attached to each of said caps and, overlying the adjacent end of said slit tube.

15. Apparatus for applying heat and pressure to an elongated, cylindrical workpiece comprising:

a tubular mandrel adapted to be disposed within said cylindrical workpiece to support the latter;

a slit tube surrounding said cylindrical workpiece and having a slit extending longitudinally of said tube to permit circumferential deflection, opposed walls of said slit being tapered and being in sliding engagement to move circumferentially of each other;

a seal acting to closed said slit tube;

a cylindrical housing surrounding said slit tube, seal means between said slit tube and said housing and forming an annular fluid pressure chamber;

a source of fluid pressure communicating with said fluid pressure chamber to apply fluid pressure to said chamber to deflect said slit tube circumferentially and apply radial pressure to said cylindrical workpiece; and heating means for selectively heating said housing and the contents of said housing simultaneously with the application of pressure.

16. The combination of claim 15 and further comprising:

a tubular shield forming an elongated annular air chamber with said housing, said air chamber containing said healing means; and duct means communicating said air chamber with the interior of said tubular mandrel to heat the latter and said cylindrical workpiece thereon.

17. The combination of claim 15 wherein said duct means place opposite ends of said mandrel in communication with opposite ends of said air chamber, respectively and means for moving said air to and from said mandrel.

* * * * *